(12) United States Patent
Krishnamurthy

(10) Patent No.: US 8,091,131 B2
(45) Date of Patent: Jan. 3, 2012

(54) METHOD AND APPARATUS FOR COMMUNICATING INTRUSION-RELATED INFORMATION BETWEEN INTERNET SERVICE PROVIDERS

(75) Inventor: Balachander Krishnamurthy, New York, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1255 days.

(21) Appl. No.: 11/260,974

(22) Filed: Oct. 28, 2005

(65) Prior Publication Data

US 2007/0011743 A1 Jan. 11, 2007

Related U.S. Application Data

(60) Provisional application No. 60/696,969, filed on Jul. 6, 2005.

(51) Int. Cl.
*G06F 11/30* (2006.01)
(52) U.S. Cl. ............... 726/23; 726/11; 726/12; 726/13; 726/14; 726/15; 726/22; 726/24; 726/25; 713/189; 370/254; 370/351; 709/221; 709/223; 709/224; 709/225; 709/226; 709/227; 709/228; 709/229
(58) Field of Classification Search ............... 726/22–25, 726/11–15; 713/188; 370/254, 351; 709/221, 709/223–229
See application file for complete search history.

(56) References Cited

U.S. PATENT DOCUMENTS

| 6,088,804 | A | * | 7/2000 | Hill et al. .................... 726/25 |
| 6,487,204 | B1 | | 11/2002 | Dacier et al. |
| 6,715,083 | B1 | * | 3/2004 | Tovander ...................... 726/23 |
| 6,751,729 | B1 | * | 6/2004 | Giniger et al. ............... 713/153 |
| 6,944,673 | B2 | * | 9/2005 | Malan et al. ................. 709/237 |
| 7,120,934 | B2 | * | 10/2006 | Ishikawa ....................... 726/23 |
| 7,213,047 | B2 | * | 5/2007 | Yeager et al. ................ 709/202 |
| 7,367,054 | B2 | * | 4/2008 | Soppera ........................ 726/13 |
| 2003/0167404 | A1 | * | 9/2003 | Han et al. ..................... 713/201 |
| 2004/0148520 | A1 | * | 7/2004 | Talpade et al. ............... 713/201 |
| 2004/0215972 | A1 | | 10/2004 | Sung et al. |

OTHER PUBLICATIONS

Yang, Y, et al., "A Framework for Large-Scale Distributed Intrusion Detection System (LDIDS) draft-yang-ldids-framework-00.txt", IETF Standard-Working-Draft, Internet Engineering Task Force, IETF, CH, Jun. 2003 (21 pages).
European Patent Office Search Report for Corresponding European Patent Application No. 06116094.1-2413 (6 pages).

* cited by examiner

*Primary Examiner* — Yin-Chen Shaw

(57) ABSTRACT

Disclosed is a system and method for the sharing of intrusion-related information. The sharing of intrusion-related information occurs via a peering relationship between a first Internet Service Provider (ISP) and a second ISP. A first node associated with a first ISP transmits intrusion-related information to a second node associated with a second ISP. The first node identifies intrusion-related information meeting a first criteria. The first node then transmits the intrusion-related information to the second node. The intrusion-related information includes one or more of a list of attackers that previously probed the first node, the protocol used, the time of the probes, and the individual alarms raised.

18 Claims, 5 Drawing Sheets

FIG. 1B

| Network 132 | Gateway 134 | Interface 136 |
|---|---|---|
| 149.76.1.0 | - | fddi0 |
| 149.76.2.0 | 149.76.1.2 | fddi0 |
| 149.76.3.0 | 149.76.1.3 | fddi0 |
| 0.0.0.0 | 149.76.1.2 | fddi0 |

130

140
142
144
146

METHOD AND APPARATUS FOR COMMUNICATING INTRUSION-RELATED INFORMATION BETWEEN INTERNET SERVICE PROVIDERS

This application claims the benefit of U.S. Provisional Application No. 60/696,969 filed Jul. 6, 2005, which is incorporated herein by reference.

BACKGROUND OF THE INVENTION

The present invention relates generally to intrusion detection, and more particularly to communicating intrusion-related information between Internet service providers.

The Internet has grown tremendously over its lifetime. The Internet has changed the way people interact, both professionally and personally. People rapidly communicate across enormous distances via email. Businesses attract new customers from around the globe via Web pages. Further, people can now shop on-line, purchasing an item from a Web page and having the item delivered to their front door without them ever leaving their home.

In addition to its many benefits, the Internet's growth and popularity has unfortunately also resulted in an increase in the number of attacks directed at a computer or network. Attacks can come in a variety of forms, such as worms, viruses, scans, Denial of Service attacks, and malware. These attacks are the result of someone trying to break into, shut down, or misuse (e.g., by sending unsolicited email from) a victim's computer system or network. These attacks can have a detrimental effect on the system or network. A denial of service attack (DoS) can lead to problems in the targeted computer and/or problems in the network branches around the targeted computer. For example, the bandwidth of a router between the Internet and a local area network (LAN) may be consumed by a DoS. The attack therefore may not only compromise the intended computer but may disrupt the entire network.

To detect these intrusions, computer system owners often employ an Intrusion Detection System (IDS): A network IDS, or NIDS, monitors packets on the network and typically attempts to discover an intruder by matching the monitored packets to a database of known attack packet patterns. For example, a NIDS can search for a large number of (TCP) connection requests to many different ports on a target machine, thus discovering if someone is attempting a TCP port scan on the target machine.

The detection and classification of attacks can, however, be inaccurate. As the volume and speed of packets traversing a network increases, the job of detecting attacks becomes more and more difficult. Further, in addition to detecting intrusions, NIDS can sometimes classify non-intrusive actions as intrusions. Because of the small number of attack classifications relative to the vast number of packets traversing the Internet, the recognition of a false positive from the relatively few positives becomes extremely burdensome and challenging. If the false positive is not recognized as such, resources may, as a result, be wasted trying to counter the supposed "attack". Further, NIDS may mistakenly drop packets associated with a false positive, thereby affecting the application waiting for those packets. Thus, there remains a need to facilitate more accurate intrusion detection.

BRIEF SUMMARY OF THE INVENTION

In accordance with the invention, and to facilitate and improve intrusion detection, Internet service providers collaborate by sharing information relating to attacks or intrusions (i.e., intrusion-related information). The sharing of intrusion-related information enables more than one ISP to conclude that they are experiencing an attack when more than one ISP see similar suspected attacks. Further, by sharing intrusion-related information, the ISPs lower the probability of a false positive. Examples of intrusion-related information include a list of Internet Protocol (IP) addresses of attackers that probed Web sites of an organization (employing a NIDS), the protocol used, the time of the probes, the individual alarms raised, etc., gathered by a NIDS. Thus, collaboration across multiple NIDS can provide network administrators with a better view of the scale of an attack, its intent, and the precise model of adversarial behavior.

The sharing of intrusion-related information occurs via a peering relationship between a first Internet Service Provider (ISP) and a second ISP. A peering relationship is a relationship between two or more ISPs in which the ISPs create a direct link over a network between each other and agree to forward each other's packets directly across this link instead of using the standard Internet backbone. Information such as routing information can be shared via this relationship.

In accordance with the present invention, a system and method for communicating intrusion-related information from a first node associated with a first ISP to a second node associated with a second ISP includes identifying, by the first node, intrusion-related information meeting a first criteria. The system and method also includes transmitting the intrusion-related information to the second node. The intrusion-related information includes one or more of a list of attackers that previously probed the first node, the protocol used, the time of the probes, and the individual alarms raised.

In one embodiment, the system and method further include identifying intrusion-related information that meets a second criteria. The second criteria may be the same as or different than the first criteria. The intrusion-related information that meets a second criteria may be transmitted to a third node associated with a third ISP.

In one embodiment, the first node receives intrusion-related information from the second node. The first node may determine whether the received information meets a usefulness metric. In other words, the first node may determine how useful the received information is to its intrusion detection and/or analysis as well as the typical data (set of packets) that the first node receives. Further, the first node may also make a determination of whether the second node meets a usefulness metric. In other words, the first node may determine what types of intrusion-related information (i.e., what intrusion signatures, such as information about a first virus A and a first worm B) the second node can typically provide to the first node and whether this type of information is useful to the first node. The first node can determine what intrusion signatures the second node is capable of delivering and a level of granularity that the second node is capable of delivering.

These and other advantages of the invention will be apparent to those of ordinary skill in the art by reference to the following detailed description and the accompanying drawings.

BRIEF DESCRIPTION OF THE DRAWINGS

FIG. 1B shows a high level block diagram of a prior art routing table;

DETAILED DESCRIPTION

To facilitate and improve intrusion detection, internet service providers (ISPs) employing network intrusion detection systems (NIDS) can collaborate by sharing intrusion-related information. Collaboration across multiple NIDS can provide network administrators with a better view of the scale of an attack, its intent, and the precise model of adversarial behavior. This collaboration occurs via a peering relationship.

Figure 1A:
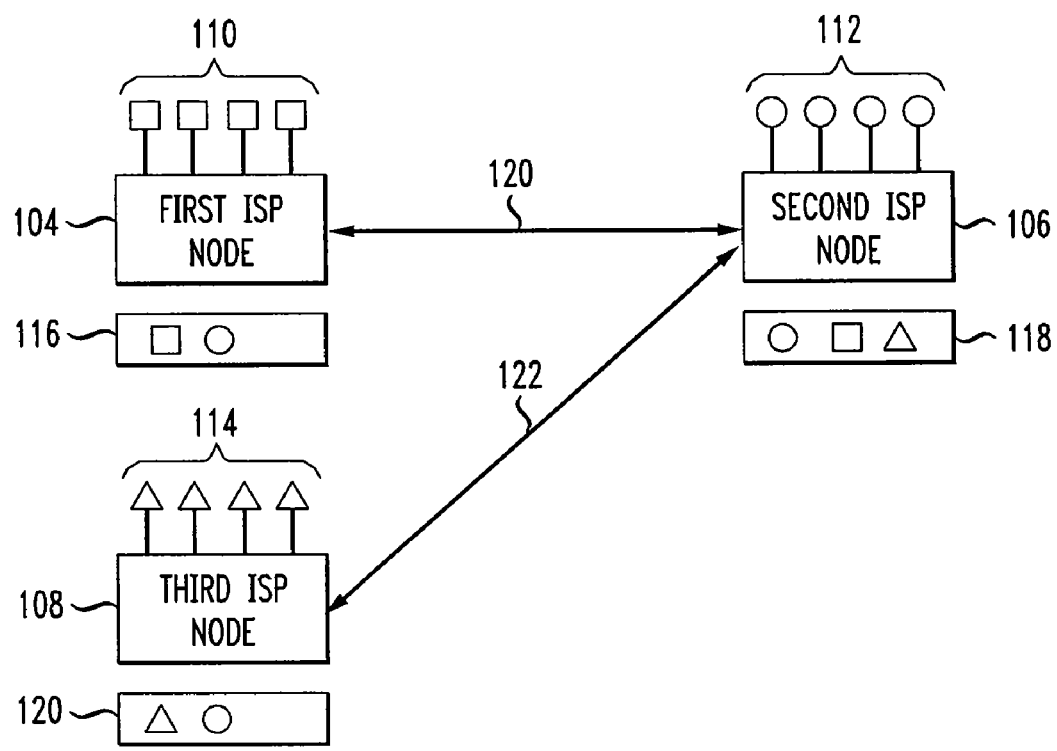
FIG. 1A shows a high level block diagram of a prior art network having three nodes associated with three internet service providers (ISPs)

In particular, FIG. 1A shows a high level block diagram of a network including a first Internet Service Provider (ISP) node 104 associated with a first ISP, a second ISP node 106 associated with a second ISP, and a third ISP node 108 associated with a third ISP. FIG. 1 illustrates a peering relationship between the first ISP and the second ISP and also between the second ISP and the third ISP. A peering relationship is a relationship between two or more ISPs in which the ISPs create a direct link between each other and agree to forward each other's packets directly across this link instead of using the standard Internet backbone. Thus, larger ISPs with their own backbone networks agree to allow traffic from other large ISPs in exchange for traffic on their backbones. They also exchange traffic with smaller ISPs so that they can reach regional end points.

For example, suppose a client of the first ISP wants to access a Web site hosted by the second ISP. If the first and second ISPs have a peering relationship, the Hypertext Transfer Protocol (HTTP) packets travel directly between the two ISP nodes 104, 106. This typically results in the client accessing the Web site more rapidly because there are fewer hops that the packets have to travel to get to their destination.

As a more detailed example, the first ISP has customers 110 (designated by a square) accessing Web pages hosted by the first ISP node 104. The second ISP 106 has customers 112 (designated by a circle) accessing Web pages hosted by the second ISP node 106. The third ISP 108 has customers 114 (designated by a triangle) accessing Web pages hosted by the third ISP node 108. The first ISP and the second ISP have a peering relationship in which the second ISP announces reachability of its customers to the first ISP node 104, and the first ISP announces reachability of its customers to the second ISP node 106. Similarly, the third ISP also has a peering relationship with the second ISP, announcing its customers 114 to the second ISP node 106 while the second ISP announces its customers 112 to the third ISP node 108. Each ISP node 104, 106, 108 may be any network device or devices, such as a computer (e.g., server), router, or server farm.

Thus, the first ISP's routing table 116 shows that the first ISP node 104 can access its customers 110 and the second ISP node's customers 112. Similarly, the third ISP node 108 has a routing table 120 showing that the third ISP node 108 can access its customers 114 and the second ISP's customers 112. Because of its peering relationship with both the first and third ISPs, the second ISP has a routing table 118 showing that the second ISP node 106 has access to its customers 112, the first ISP's customers 110, and the third ISP's customers 114.

Also referring to FIG. 1B, a routing table 130 associated with, e.g., the first ISP node 104, includes three columns—a network column 132, a gateway column 134, and an interface column 136. The routing table 130 links the networks of the first ISP 104 to gateways that reach other networks (e.g., the network(s) associated with the second ISP).

The network column 132 includes a list of IP addresses corresponding to networks that the first ISP node connects to. Thus, routes that the first ISP node is directly connected to do not require a gateway and are shown with a gateway entry (in the gateway column 134) of "-" (i.e., in row 140). Thus, as shown in rows 142 and 144, the first ISP node connects to the second ISP node 106 (e.g., 149.76.2.0) and the third ISP node 108 (e.g., 149.76.3.0) via gateways 149.76.1.2 and 149.76.1.3, respectively. A catch-all entry (the default route) 146 is the gateway associated with network 0.0.0.0. All packets to unknown networks are sent through the default route. The interface column 136 shows that the interface used to connect to the network in the network column 132.

The peering relationship between the ISPs therefore enables the creation of a direct link 120 between the first and second ISP nodes 104, 106 and a direct link 122 between the second and third ISP nodes 106, 108). Thus, the relationship enables a private exchange of routing information between ISP nodes.

A peering relationship does not, however, traditionally result in the exchange of information meeting particular criteria between multiple ISPs. In other words, the first ISP node 104 transmits all packets associated with an access of a Web page hosted by the second ISP node 106 to the second ISP node 106. The first ISP node 104 does not filter the packets before transmitting the packets associated with the second ISP node 106 to the second ISP node 106. Thus, if 500 megabytes of data can use the direct link 120 to access the second ISP node 106, the first ISP node 104 uses link 120 for the 500 megabytes of data. The data is transmitted without analysis and/or filtering. Instead, the data is blindly moved across the link 120.

Figure 2:
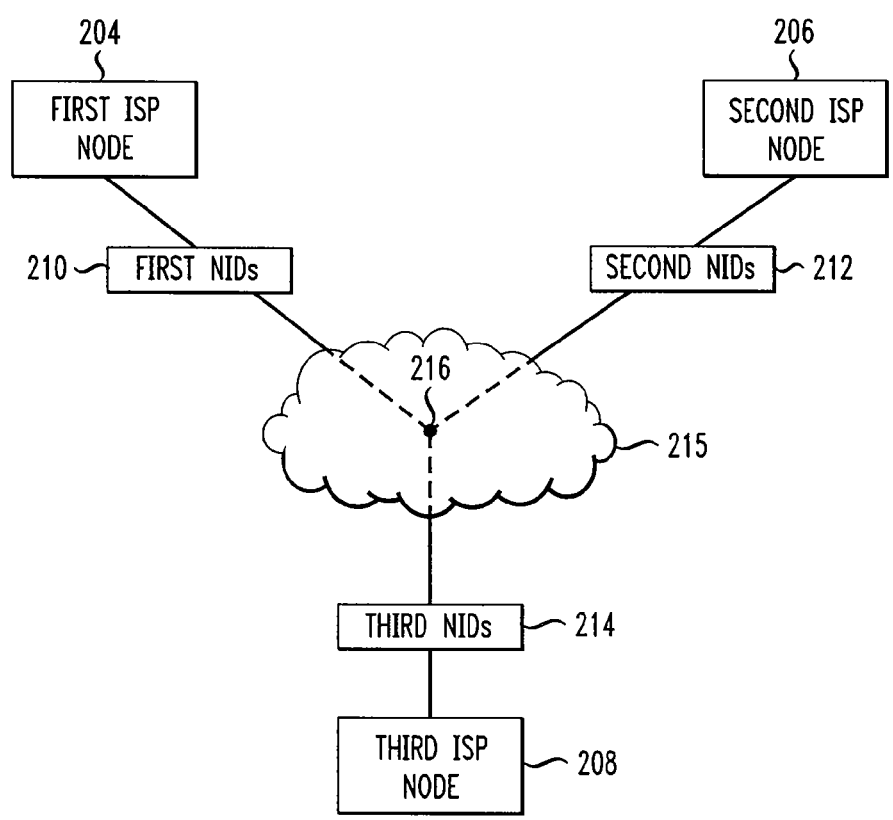
FIG. 2 shows a high level block diagram of a network having the three ISP nodes, each ISP node having an associated network intrusion detection system (NIDS) in accordance with an embodiment of the invention.

FIG. 2 illustrates a block diagram with three ISP nodes 204, 206, 208 having three NIDS 210, 212, 214, respectively. The three ISPs associated with the three ISP nodes 204, 206, and 208 have a peering relationship over network 215. The links enabling the relationship are interconnected at peering point 216. Peering point 216 is a point at which networks interconnect. In one embodiment, the peering point 216 is a private cross connect. Alternatively, the peering point is an Ethernet switch that participants (e.g., ISPs) plug into to connect their networks.

The first ISP node 204, second ISP node 206, and third ISP node 208 exchange intrusion-related information in accordance with the ISPs' peering relationship. This collaboration across multiple NIDS can provide network administrators with a better view of the scale of an attack, its intent, and the precise model of adversarial behavior. Although shown with a multilateral peering agreement between three ISPs, the present invention applies to peering relationships between any number of ISPs (i.e., two or more ISPs).

Each ISP can deploy the NIDS in the same or different locations on the network. For example, the first ISP may deploy an NIDS 210 between the ISP node 204 and a firewall (not shown) or between a firewall and the network 215. The second ISP may alternatively (or additionally) deploy a NIDS 212 in front of a particular customer to detect and prevent attacks on the customer's network. Further, the NIDS may be a software module (e.g., within the ISP, etc.) or may be a standalone appliance (e.g., distributed NIDS using sensors).

Each NIDS 210, 212, 214 may have one or more of a list of known viruses, likely targets, text strings likely denoting an attack (e.g., "copy login passwords"), rules to classify an attack, etc. When received and analyzed packets fall within a rule or match a virus signature, the NIDS 210, 212, 214 typically classify the packets as an attack. The present invention enables organizations (ISPs) to selectively exchange intrusion-related information. For example, if the first ISP and the second ISP trust each other, each may disclose intrusion-related information relating to attacks they experienced or are experiencing. Examples of the intrusion-related information include the list of Internet Protocol (IP) addresses of attackers that probed their Web sites, the protocol used, the time of the probes, the individual alarms raised, etc., gathered by each NIDS 210, 212, 214. The intrusion-related information may be stored in logs (e.g., logs created by each NIDS containing full packet headers for all suspicious packets).

The benefits of collaborating with respect to intrusion-related information are numerous. For example, the collaboration may result in the realization that ISP nodes 204, 206, 208 are experiencing a similar profile of attackers. Moreover, ISP nodes 204, 206, 208 may determine to take similar protective steps to counter the attacks based on the shared information. For example, one or more ISP nodes can blacklist malicious or compromised Internet Protocol addresses.

To determine which ISP(s) to share information with, an ISP node 204, 206, 208 may extract information from other ISP nodes 204, 206, 208 (and/or the information transmitted by the ISP nodes) to determine whether an ISP node may have useful information. The information and/or ISP may have to meet a predetermined usefulness metric. The usefulness metric may be different for or the same for the ISP and for the intrusion-related information. For example, if an organization is primarily a Web hosting site, the organization is likely more interested in obtaining information about attacks at this layer of the protocol stack (i.e., application layer) and may be less interested in another layer (e.g., physical layer). Thus, before ISP(s) enter into a peering relationship with another ISP, the ISP(s) may explore the node associated with the other ISP (i.e., the ISP wanting to form a peering relationship) in terms of what useful intrusion signature the node is capable of delivering and the level of granularity. Alternatively, one ISP may enter into a temporary relationship with another ISP to determine the type of information that the other ISP can provide.

Further, an ISP such as the first ISP can end a peering relationship with another ISP (or multiple ISPs) such as the second ISP if the first ISP determines that the second ISP is not providing enough information or the intrusion-related information is not useful to the first ISP.

The peering relationships may also be different between ISPs. Thus, the first ISP node 204 may be sharing intrusion-related information having a particular criteria (e.g., all information related to a first virus) with the second ISP node 206 but may be sharing different intrusion-related information (i.e., intrusion-related information having a second criteria, such as a subset of information associated with a Denial of Service Attack) to the third ISP node 208. For example, the first ISP node 204 may share with the second ISP node 206 that four servers within its network have been compromised due to a first virus in the last two days. The first ISP node 204 may also share with the second ISP node 206 that a server in a particular location has received 2 thousand emails from the same source IP address. The first ISP node 204 shares these subsets of information with the other ISP nodes to learn from what the other ISPs are experiencing and to prevent future attacks (e.g., from the same source IP address, from the first virus). Furthermore, as part of the first ISP's selective transmission of intrusion-related information, the first ISP (i.e., the first ISP node 104) may not transmit that the first virus compromised four servers but a second virus compromised twenty servers during the same time period. The first ISP may instead choose to share this information with another ISP (e.g., if the first ISP believes this other ISP is more prone to the second virus). Of course, various other combinations are also possible.

Similarity of attack is one possibility by which ISP's may determine to enter into a peering relationship. Alternatively, the collaboration of ISPs and the selective sharing of intrusion-related information may be based on the ISP's desire to reduce the cost associated with dealing with network and system attacks. The sharing of information is typically mutually beneficial to all of the ISPs involved. Moreover, the sharing of information between ISPs is private and secure because of the peering relationship. No other outside entity has access to the information being communicated between the two or more ISPs having the relationship.

Figure 3:
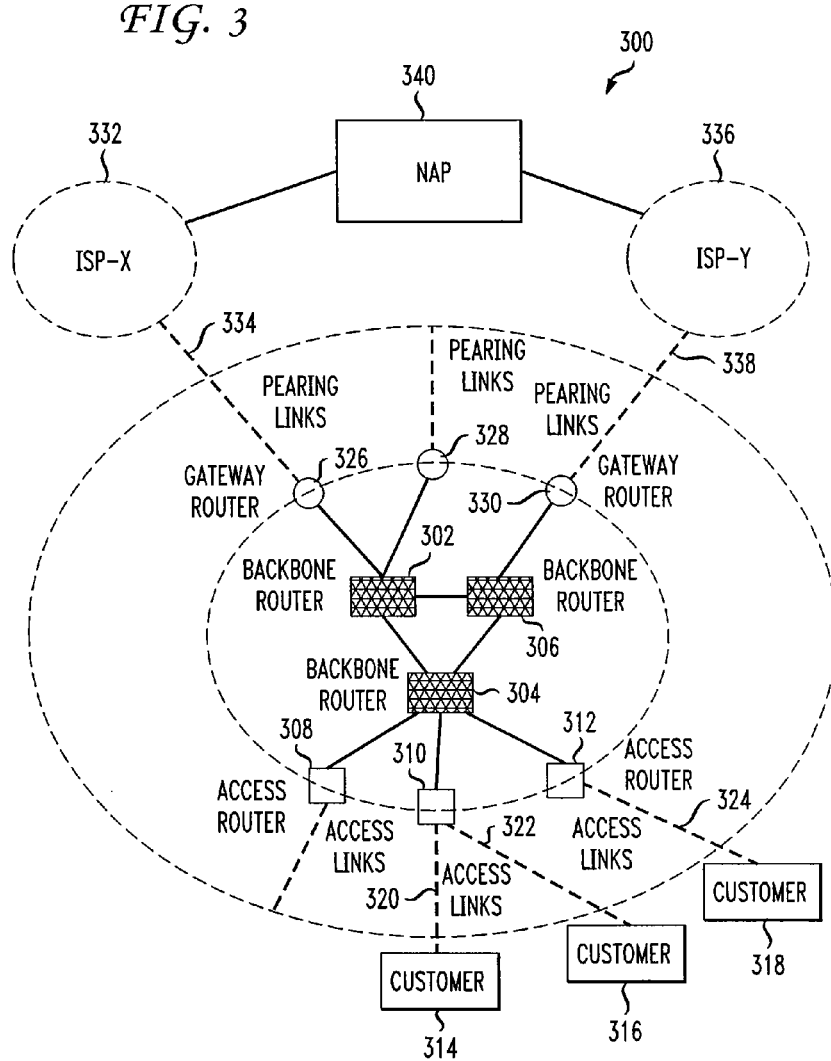
FIG. 3 is a block diagram of an ISP node in accordance with an embodiment of the invention.

FIG. 3 shows a block diagram of an ISP node 300. ISP node 300 includes numerous routers such as backbone routers 302, 304, 306 and access routers 308, 310, 312 communicating with customers 314, 316, 318 via access links 320, 322, 324. Backbone routers 302, 304, 306 also communicate with gateway routers 326, 328, 330. ISP node 300 can exchange data traffic and/or intrusion-related information with ISP node 332 via peering link 334. Similarly, ISP node 300 can exchange data traffic and/or intrusion-related information with ISP node 336 via peering link 338. FIG. 3 also includes a network access point (NAP) 340 between ISP node 332 and ISP node 336.

Figure 4:
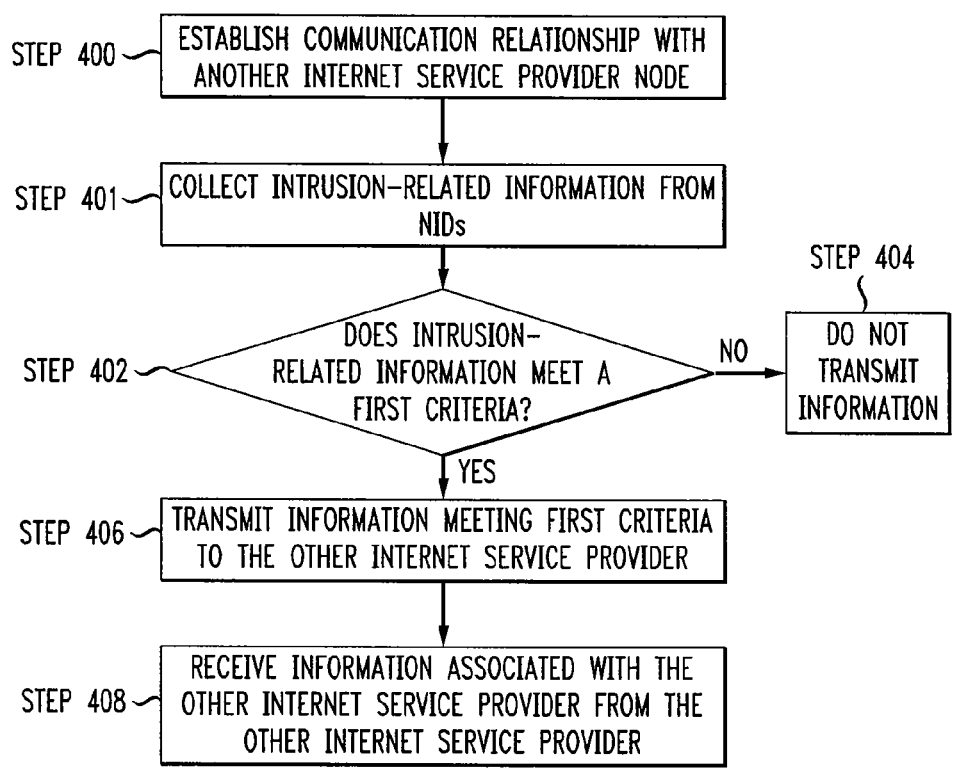
FIG. 4 illustrates a flowchart of the steps performed to share intrusion-related information in accordance with an embodiment of the invention.

FIG. 4 shows a flowchart illustrating the steps performed by an ISP node to selectively and privately share intrusion-related information with another ISP. A first ISP and a second ISP agree to exchange information using out of band means. The first ISP node 204 then establishes a communication relationship with a second (or more) ISP node 206 in step 400. The communication relationship may be any type of agreement between the ISPs (and, therefore, the ISP nodes 204, 206, 208). The communication relationship may also change as the parties determine that they want to share more information (e.g., as the trust between the parties grows) or that they want to share less information (e.g., as the trust between the parties decreases). The trust associated with a particular ISP may be determined from reputation, previous dealings with the ISP, and/or instinct.

The first ISP node 204 then collects intrusion-related information from its NIDS in step 401 and determines what intrusion-related information it is going to transmit to the second (or more) ISP node(s) 206, 208. The first ISP node 204 specifically determines whether intrusion-related information meets a first criteria in step 402. The first criteria is typically designated in the peering relationship between the two parties. Using the example described above, the first criteria may be how many attacks the ISP node is experiencing that are associated with a particular virus.

If intrusion-related information does not meet the criteria in step 402, then the first ISP node 204 does not transmit the information to the second (or more) ISP node(s) 206, 208 in step 404. Thus, the first ISP node 204 is selective as to what intrusion-related information is transmitted to the other ISP node(s). If the information meets the criteria in step 402, then the first ISP node 204 transmits the intrusion-related information to the second ISP node 206 in step 406. The first ISP node 204 then receives, in step 408, information associated with the second ISP from the second ISP node 206. The reception of information from other ISP node(s) may occur at any time and is not related to the transmission of the information.

The exchange of intrusion-related information does not have any relationship with the peering of data between ISPs. Two ISPs may exchange intrusion-related information without ever peering data.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for communicating intrusion-related information from a first node associated with a first internet service provider to a second node associated with a second internet service provider comprising:
   establishing a peering relationship between the first node and the second node, the peering relationship specifying a peering point;
   establishing a direct link between the first internet service provider and second internet service provider for forwarding packets from the second internet service provider to the first internet service provider without routing via a public link, the direct link comprising the peering point;
   enabling exchange of private routing information of the first internet service provider and second internet service provider between the first and second node across the direct link, the private routing information specifying a network address for the first node;
   identifying, by the first node, first intrusion-related information meeting a first criteria;
   receiving, by the first node, second intrusion-related information from the peering point, the second intrusion-related information routed to the first node using the private routing information via the direct link;
   determining whether the second intrusion-related information comprises information about an attack at a protocol stack layer;
   modifying the peering relationship to generate a modified peering relationship based on the second intrusion-related information and the determining whether the second intrusion-related information comprises information about the attack at the protocol stack layer; and
   determining whether to transmit the first intrusion-related information to the second node via the direct link in accordance with the modified peering relationship.

2. The method of claim 1 further comprising identifying third intrusion-related information meeting a second criteria.

3. The method of claim 2 wherein the second criteria is the same as the first criteria.

4. The method of claim 2 further comprising transmitting the second intrusion-related information to a third node associated with a third internet service provider.

5. The method of claim 1 further comprising receiving third intrusion-related information from the second node.

6. The method of claim 5 further comprising determining whether the received third intrusion-related information meets a first usefulness metric.

7. The method of claim 6 further comprising determining whether the second node meets a second usefulness metric.

8. The method of claim 7 further comprising determining intrusion signatures the second node is capable of delivering and a level of granularity that the second node is capable of delivering.

9. The method of claim 1 wherein the second intrusion-related information comprises a list of attackers that previously probed the second node, the list of attackers that previously probed the second node comprising, for each attacker: protocol used, time of probe, and individual alarms raised.

10. A first node associated with a first internet service provider communicating intrusion-related information to with a second node associated with a second internet service provider, the first node comprising:
    a processor configured to:
    establish a peering relationship between the first node and the second node, the peering relationship specifying a peering point;
    establish a direct link between the first internet service provider and second internet service provider for forwarding packets from the second internet service provider to the first internet service provider without routing via a public link, the direct link comprising the peering point;
    enable exchange of private routing information of the first internet service provider and second internet service provider between the first and second node across the direct link, the private routing information specifying a network address for the first node;
    identify first intrusion-related information meeting a first criteria designated by the peering relationship;
    receive, by the first node, second intrusion-related information from the peering point, the second intrusion-related information routed to the first node using the private routing information via the direct link;
    determine whether the second intrusion-related information comprises information about an attack at a protocol stack layer;
    modify the peering relationship to generate a modified peering relationship based on the second intrusion-related information and whether the second intrusion-related information comprises information about the attack at the protocol stack layer; and
    determine whether to transmit the first intrusion-related information to the second node in accordance with the modified peering relationship; and
    an interface configured to communicate via the direct link the first intrusion-related information to the second node.

11. The first node of claim 10 wherein the processor is further configured to identify third intrusion-related information meeting a second criteria.

12. The first node of claim 11 wherein the second criteria is the same as the first criteria.

13. The first node of claim 11 wherein the interface is configured to transmit the second intrusion-related information to a third node associated with a third internet service provider.

14. The first node of claim 10 wherein the interface is configured to receive third intrusion-related information from the second node.

15. The first node of claim 14 wherein the processor determines whether the received third intrusion-related information meets a first usefulness metric.

16. The first node of claim 15 wherein the processor is configured to determine whether the second node meets a third usefulness metric.

17. The first node of claim 16 wherein the processor is configured to determine intrusion signatures the third node is capable of delivering and a level of granularity that the third node is capable of delivering.

18. The first node of claim 10 wherein the second intrusion-related information comprises a list of attackers that previously probed the second node, the list of attackers that previously probed the second node comprising, for each attacker: protocol used, time of the probe, and individual alarms raised.

* * * * *